(12) United States Patent
Naserimojarad et al.

(10) Patent No.: US 10,598,248 B2
(45) Date of Patent: Mar. 24, 2020

(54) SMART FLUID DAMPER

(71) Applicant: SIMON FRASER UNIVERSITY, Burnaby (CA)

(72) Inventors: Mohammad Mehdi Naserimojarad, Vancouver (CA); Mehrdad Moallem, Burnaby (CA); Siamak Arzanpour, Burnaby (CA)

(73) Assignee: SIMON FRASER UNIVERSITY, Burnaby (CA)

( * ) Notice: Subject to any disclaimer, the term of this patent is extended or adjusted under 35 U.S.C. 154(b) by 111 days.

(21) Appl. No.: 15/801,042

(22) Filed: Nov. 1, 2017

(65) Prior Publication Data

US 2019/0128362 A1    May 2, 2019

(51) Int. Cl.
*F16F 9/19* (2006.01)
*F16F 9/53* (2006.01)
(Continued)

(52) U.S. Cl.
CPC .............. *F16F 9/535* (2013.01); *B62K 25/08* (2013.01); *B62K 25/10* (2013.01); *B62K 25/28* (2013.01);
(Continued)

(58) Field of Classification Search
CPC ...... F16F 9/535; F16F 9/19; F16F 9/34; F16F 9/532; F16F 9/0281; F16F 2222/12;
(Continued)

(56) References Cited

U.S. PATENT DOCUMENTS 8,205,728 B2   6/2012  Bose et al.
8,770,357 B2   7/2014  Sims et al.
(Continued)

FOREIGN PATENT DOCUMENTS

JP    2006307982    11/2006
WO    9839577    9/1998

OTHER PUBLICATIONS

J. David Carlson, Mark R Jolly, "MR fluid, foam and elastomer devices", Mechatronics, vol. 10, Issues 4-5, Jun. 1, 2000, pp. 555-569.

(Continued)

*Primary Examiner* — Kevin Hurley
*Assistant Examiner* — Marlon A Arce
(74) *Attorney, Agent, or Firm* — Norton Rose Fulbright Canada LLP (57) ABSTRACT

A smart fluid damper includes a damper body defining a cavity with smart fluid. A piston head is disposed within the cavity and is slidingly displaceable. A flow control element is disposed within the cavity. The flow control element includes a main body having a central core, and an outer housing that surrounds the main body and is spaced apart therefrom to define a fluid passage between the main body and the outer housing. The fluid passage extends axially through the main body to permit fluid flow therethrough. The central core includes an energizable coil operable to apply a field. A plurality of field barriers are provided, each operable to locally block the field generated by the energizable coil such that the field cannot pass directly therethrough. The field barriers are configured to focus the field within the fluid passage.

18 Claims, 11 Drawing Sheets

(51) Int. Cl.
*B62K 25/08* (2006.01)
*B62K 25/10* (2006.01)
*F16F 9/34* (2006.01)
*B62K 25/28* (2006.01)
*F16F 9/02* (2006.01)
*F16D 37/02* (2006.01)
*G05G 5/03* (2008.04)

(52) U.S. Cl.
CPC ............... *F16F 9/19* (2013.01); *F16F 9/34* (2013.01); *F16F 9/532* (2013.01); *F16D 37/02* (2013.01); *F16F 9/0281* (2013.01); *F16F 2222/12* (2013.01); *F16F 2224/0208* (2013.01); *F16F 2224/043* (2013.01); *F16F 2224/045* (2013.01); *F16F 2228/066* (2013.01); *G05G 5/03* (2013.01)

(58) Field of Classification Search
CPC ......... F16F 2224/0208; F16F 2224/043; F16F 2224/045; F16F 2228/066; B62K 25/08; B62K 25/10; B62K 25/28; F16D 37/02; F16D 57/002; G05G 5/03
See application file for complete search history.

(56) References Cited

U.S. PATENT DOCUMENTS

| | | | |
|---|---|---|---|
| 2003/0019700 A1 | 1/2003 | Wittig | |
| 2003/0029683 A1* | 2/2003 | Oliver | F16F 9/3214 188/267.2 |
| 2003/0192752 A1 | 10/2003 | Lun et al. | |
| 2004/0195062 A1* | 10/2004 | Anderfaas | F16F 9/535 188/267.2 |
| 2012/0160621 A1 | 6/2012 | Battlogg et al. | |
| 2013/0175132 A1* | 7/2013 | Battlogg | F16D 37/02 192/21.5 |
| 2016/0153508 A1* | 6/2016 | Battlogg | G05G 5/03 74/553 |

OTHER PUBLICATIONS

John W. Gravatt, "Magneto-Rheological Dampers for Super-sport Motorcycle Applications", MSC Thesis, Virginia Polytechnic Institute and State University, May 2003.
Yang Ding, Lu Zhang, Hai-Tao Zhu and Zhong-Xian Li, "A new magnetorheological damper for seismic control", Smart Materials and Structures, vol. 22, No. 11.
Z Jiang and R Christenson, "A comparison of 200 kN Magneto-rheological damper models for use in real-time hybrid simulation pretesting", Smart Materials and Structures, vol. 20, No. 6.
Xu Yanhai, Medhi Ahmadian, and Renyun Sun. "Improving vehicle lateral stability based on variable stiffness and damping suspension system via MR damper." Vehicular Technology, IEEE Transactions on 63.3 (2014): 1071-1078.
Raja Pramod, Xiaojie Wang, and Faramarz Gordaninejad. "A high-force controllable MR fluid damper-liquid spring suspension system." Smart Materials and Structures 23.1 (2013): 0515021.
Bulea Thomas C., et al. "A variable impedance knee mechanism for controlled stance flexion during pathological gait." Mechatronics, IEEE/ASME Transactions on 17.5 (2012): 822-832.
Chen, J. Z., and W. H. Liao. "Design, testing and control of a magnetorheological actuator for assistive knee braces." Smart Materials and Structures 19.3 (2010): 035029.
Partak Z, Engin T, Sahin I. Optimal Magnetorheological Damper Configuration Using the Taguchi Experimental Design Method. ASME J. Mech. Des 2013:135(8): 081008-081008-9 doi'10 . . . 1115/1.4024719.
Nguyen, Q. H., et al. "An analytical method for optimal design of MR valve structures." Smart Materials and Structures 18.9 (2009): 095032.
Nguyen Quoc-Hung and Seung-Bok Choi. "Optimal design of a vehicle magnetorheological damper considering the damping force and dynamic range." Smart materials and Structures 118.1 (2008): 015013.
Gavin, Henri, Jesse Hoagg, and Mark Dobossy. "Optimal design of MR dampers." Proceedings of the US-Japan Workshop on Smart Structures for Improved Seismic Performam=nce in Urban Regions. vol. 14. 2001.
Goldasz Janusz and Bogdan Saponski, Insight into magnetorheological shock absorbers. Springer, 2015.
Janusz Goldasz, "Electro-mechanical analysis of a magnetorheological damper with electrical steel laminations".
S. Sassi, K. Cherif, L. Mezghani, M. Thomas, and A. Kotrane, "An innovative magnetorheological damper for automotive suspension: from design to experimental characterization," Smart Mater Struct., vol. 14, No. 4, pp, 811-822, Aug. 2005.
Sapinski Bogdan. "Experimental study of a self-powered and sensing MR-damper-based vibration control system." Smart Materials and Structures 20.10 (2011): 105007.
Böse, Holger, and Johannes Ehrlich. "Magnetorheological dampers with various designs of hybrid magnetic circuits." Journal of Intelligent Material Systems and Structures 23.9 (2012): 979-987.
International Search Report and Written Opinion dated Apr. 24, 2018.

* cited by examiner

SMART FLUID DAMPER

TECHNICAL FIELD

The application relates generally to vibration damping mechanisms and, more particularly, to a smart fluid damper.

BACKGROUND

So-called "smart" fluids, such as magnetorheological (MR) fluids and electrorheological (ER) fluids, are fluids that have one or more properties that can change when a given external field is applied thereto. Such external fields may include, for example, a magnetic field in the case of MR fluids and an electric field in the case of ER fluids. The variable properties of such smart fluids may include, for example, viscosity, surface tension, yield stress point, and the like. In the case of MR fluids, an applied magnetic field acts to manipulate the MR fluid, which has micron-sized ferromagnetic particles in a carrier liquid, such as silicone or hydrocarbon oil. Apparent viscosity of the MR fluid can accordingly be varied and thus controlled.

Attempts have been made to use MR fluid dampers as "controllable" shock absorbers that are capable of attenuating vibrations and/or motion to variable degrees by manipulating the MF fluid within the shock absorber, and thus the damping factor of the shock absorber. The shock absorber can thus be made "softer" or "stiffer", as required, by controlling the strength of the magnetic field to which the MR fluid in the shock absorber is subjected. More specifically, this manipulation of the MR fluid occurs because the ferromagnetic particles in the MR fluid align along the lines of magnetic flux to form chains within the fluid, when the fluid is exposed to a magnetic field. This has the effect of increasing the apparent viscosity of the fluid. Generally speaking, the greater the magnitude of the magnetic field to which the MR fluid is exposed, the more the ferromagnetic particles are aligned, and the higher the apparent viscosity of the fluid—and this for as long as the magnetic field is applied. The stiffness of the damper can thereby be controlled. ER fluid dampers operate in a similar manner, except that the field to which the ER fluid within the damper is applied is an electric field, the strength of which can be controlled as desired to increase or decrease the stiffness of the ER fluid damper.

The MR fluid used in known MR dampers is however typically much denser and heavier than a conventional hydraulic fluid, due to the presence of the ferromagnetic particles in the MR fluid, which therefore increases the overall weight of the damper. While this weight penalty may not be of significant concern for certain applications where weight is not critical, existing MF dampers are less desirable for use in applications in which the weight of the shock absorber is an important factor. Since MR dampers are difficult to scale down in size and/or weight, their use to date has typically been limited to large-scale applications and/or applications which are not weight sensitive.

Furthermore, many existing MR dampers require a continuous electric current be supplied to the electromagnets in order to keep the MR fluid magnetized, and thus so as to maintain an operationally functional damping effect. A similar challenge exists with ER dampers. This imposes a power consumption penalty to the dampers, and further reduces the practicality of such MR or ER dampers for applications in which it may not be possible or desirable to supply a constant source of power to the MR or ER damper.

An improved smart fluid damper is therefore sought.

SUMMARY OF THE INVENTION

There is accordingly provided a smart fluid damper, comprising: a damper body defining a cavity having a smart fluid stored therein; a piston having a piston head disposed within the cavity of the damper body and slidingly displaceable therein along a piston axis; and a flow control element disposed within the cavity of the damper body, the flow control element including a main body having a central core, an outer housing that surrounds the main body and is spaced apart therefrom to define at least one fluid passage between the main body and the outer housing, the fluid passage extending a complete axial length of the main body to permit fluid flow therethrough from one axial side of the flow control element to the other, the central core including an energizable coil operable to generate a field to the smart fluid in the fluid passage, and a plurality of field barriers each operable to locally block the field generated by the energizable coil such that the field cannot pass therethrough, a first group of the field barriers being mounted to the main body of the flow control element and axially spaced-apart along the main body, a second group of the field barriers being mounted to the outer housing of the flow control element across the fluid passage and axially spaced-apart along the outer housing, the first and second groups of the field barriers configured to focus the field within the fluid passage.

In another aspect, there is also provided a bicycle, comprising: a frame to which a front wheel and a rear wheel are rotatably mounted; and a suspension system disposed between a portion of the frame and at least one of the rear wheel and the front wheel of the bicycle, the suspension system comprising: a smart fluid damper, comprising: a damper body defining a cavity having a smart fluid stored therein; a piston having a piston head disposed within the cavity of the damper body and slidingly displaceable therein along a piston axis; and a flow control element disposed within the cavity of the damper body, the flow control element including a main body having a central core, an outer housing that surrounds the main body and is spaced apart therefrom to define a fluid passage between the main body and the outer housing, the fluid passage extending a complete axial length of the main body to permit fluid flow therethrough from one axial side of the flow control element to the other, the central core including an energizable coil operable to apply a field to the smart fluid in the fluid passage, and a plurality of field barriers each operable to locally block the field generated by the energizable coil such that the field cannot pass therethrough, a first group of the field barriers being mounted to the main body of the flow control element and axially spaced-apart along the main body, a second group of the barriers being mounted to the outer housing of the flow control element across the fluid passage from the first group of barriers and axially spaced-apart along the outer housing, the first and second groups of the field barriers configured to focus the field within the fluid passage.

There is also provided a method of dampening a movement with a smart fluid damper, the method comprising using a flow control element disposed within a cavity of the damper to apply a field to the smart fluid within a fluid passage extending through the flow control element, and using a number of field barriers disposed within the flow control element and proximate the fluid passage on either side thereof to locally block the field such that the field cannot pass therethrough, the field barriers arranged to cause the field to criss-cross the fluid passage at multiple axial intervals thereby focusing the field within the fluid passage.

There is further provided a magnetorheological (MR) fluid damper comprising a damper body defining therewithin a cavity containing an MR fluid therewithin and a piston having a piston head displaceable within the cavity, and a flow control element disposed within the cavity of the damper body and configured to apply a magnetic field to the MR fluid within a fluid passage axially extending through the flow control element to allow the MR fluid to flow from one side of the flow control element to the other within the cavity, the flow control element having a number of field barriers disposed on either side of the fluid passage, the field barriers operable to locally block and/or divert the magnetic field such that the field cannot pass directly therethrough, the field barriers staggered on either side of the fluid passage to force the magnetic field to criss-cross the fluid passage at multiple axial intervals along the fluid passage thereby focusing the magnetic field within the fluid passage.

BRIEF DESCRIPTION OF THE DRAWINGS

Reference is now made to the accompanying figures in which.

DETAILED DESCRIPTION

The smart fluid dampers as described herein are configured to attenuate, absorb, or otherwise lessen the kinetic energy emanating from a source of shock or vibration so that its effect on a component being shielded from the source of shock or vibration is reduced. Although the term "damper" will be used herein with reference to the described devices, such devices are also commonly referred to as "shock absorbers". As will be discussed in greater detail below, the present smart fluid dampers provide advantageous force attenuation relative to their size and weight, thereby making them suitable for a wide range of weight and power sensitive applications. Examples of applications wherein the present smart fluid dampers may be used include, but are not limited to, automobiles, aircraft and other airborne vehicles, robotics, prosthetics, exoskeletons, and human/muscle-powered vehicles such as bicycles. In this regard, although the smart fluid dampers as described herein will be principally discussed in connection with their use in the suspension system of a bicycle, it is to be understood that the dampers of the present disclosure can be used in any one or more of the above-noted applications or in other suitable applications, wherein it may be desirable or necessary to provide variable, controlled, damping of vibrations while remaining relative light weight and/or while consuming less power than known MR dampers.

As noted above, so-called "smart" fluids as referred to herein are understood to include magnetorheological (MR) fluids and electrorheological (ER) fluids. While the embodiments of the dampers of the present disclosure will now generally be described below with reference to embodiments with MR fluid and MR fluid dampers, it is to be understood that the concepts and features of the MR dampers as described herein, and all of the embodiments described below, can also be adapted for use in ER fluid dampers and other smart fluid vibration dampers. For ease of reference, therefore, the smart fluid dampers of the present disclosure will therefore now be referred to simply as "MR dampers", which employ MR fluid therein which is controlled by magnets in the manners described hereinbelow. This however does not preclude the application of their designs to ER or other smart fluids, with the necessary modifications which may be required given the type of fluid employed. Nor does this preclude the application of their designs to anywhere or any device in which the flow of a material (e.g. fluid, gas, plasma) with magnetic properties (i.e. ferromagnetic, ferrimagnetic, paramagnetic, and diamagnetic) is of interest and/or may be used. The designs of the present dampers as described herein may be useful for a variety of different applications, including for example magnetic valves, clutches, and magnetic drug delivery systems, etc.

Figure 1A:
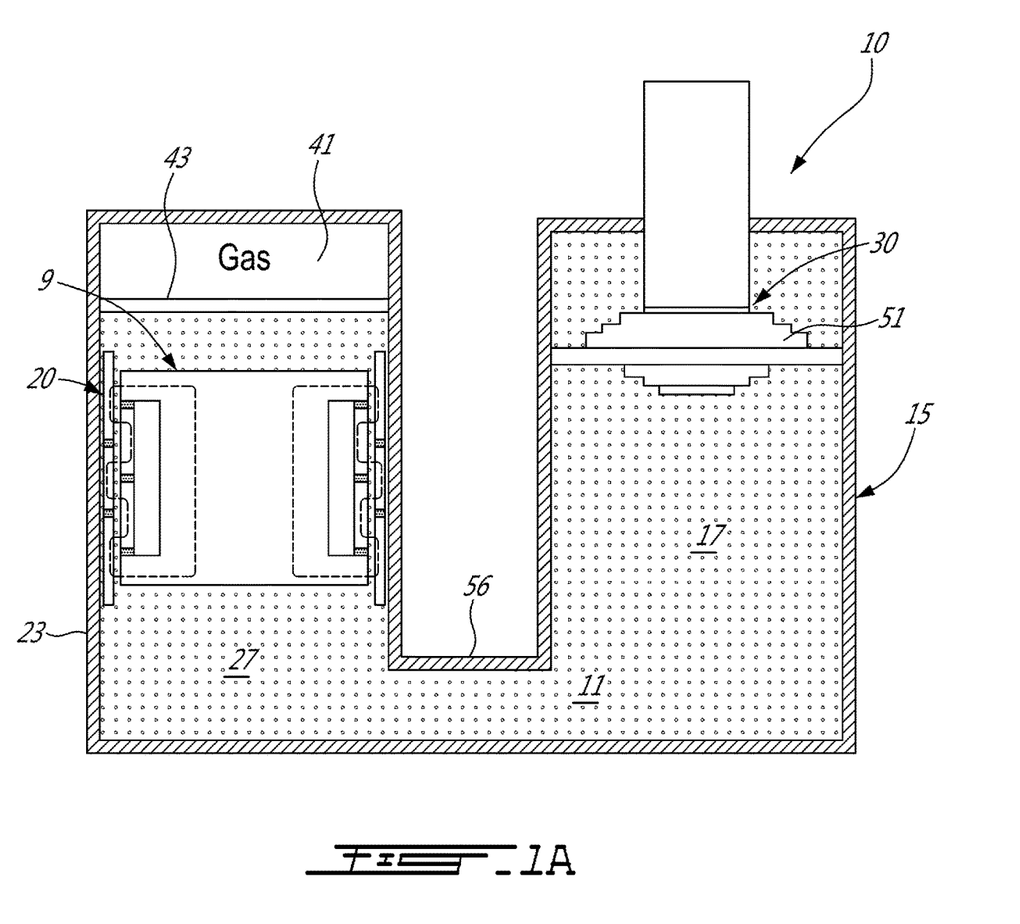
FIG. 1A is a cross-sectional side view of a smart fluid damper in accordance with an embodiment of the present disclosure, wherein a flow control element of the smart fluid damper is stationary and operates as a valve within the damper.
Figure 1B:
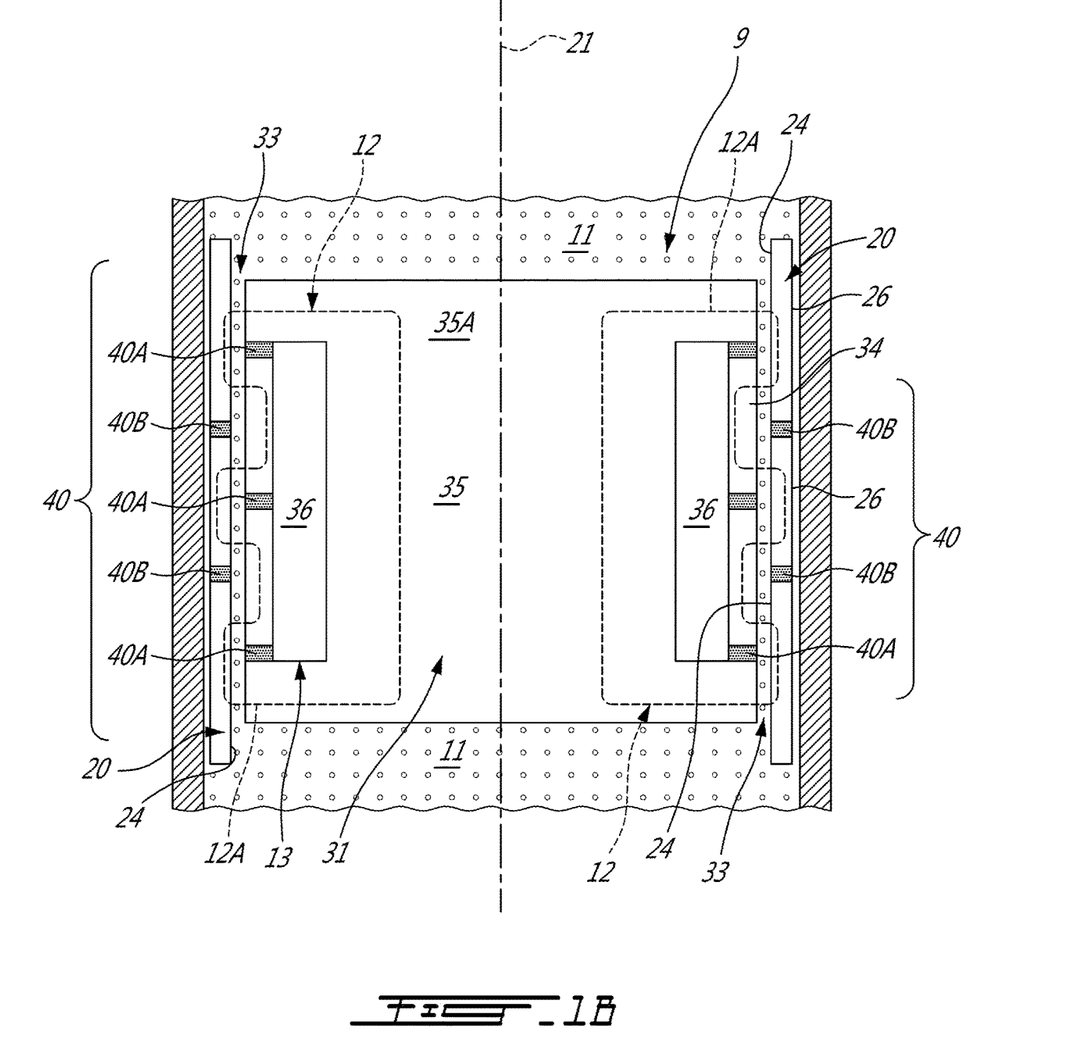
FIG. 1B is a detailed cross-sectional side view of the flow control element of the smart fluid damper of FIG. 1A.

Referring to FIGS. 1A and 1B, the MR dampers 10 described herein (sometimes simply referred to herein simply as a "damper 10") employ a magnetorheological (MR) fluid 11 as the working fluid. The MR fluid 11 is a "smart fluid", or one whose properties (e.g. its viscosity) can be changed by applying a magnetic field 12 to the MR 11. MR fluids are composed of micron-sized ferromagnetic particles dispersed in a carrier fluid such as silicon oil or hydrocarbon oil. When the magnetic field 12 is applied to the MR fluids, the ferromagnetic particles form a chain aligned along the flux lines 12A of the magnetic field 12. This chain formation increases the viscosity of the MR fluid, thereby improving its damping capabilities. Modifying the magnetic field 12 will also modify the chain formations and thus the viscosity of the MR fluid. Therefore, modifying the magnetic field 12 allows the stiffness of the damper 10 to be controlled. If the magnetic field 12 fails or is deactivated, the damper 10 will operate as a conventional hydraulic damper. Therefore, in this regard, MR dampers 10 are known as being "fail-safe" controllable dampers.

The present disclosure provides improved dampers 10, 110, 210, 310, 410 which, as will be described in further detail below, all include a flow control element 9, 19, 29, 319 through which the MR fluid flows during operation of the damper. Before describing each of the embodiments of the present damper(s), the main core of each of these dampers, namely the aforementioned flow control element 9, 19, 29, 319 will first be described in general terms.

Figure 3A:
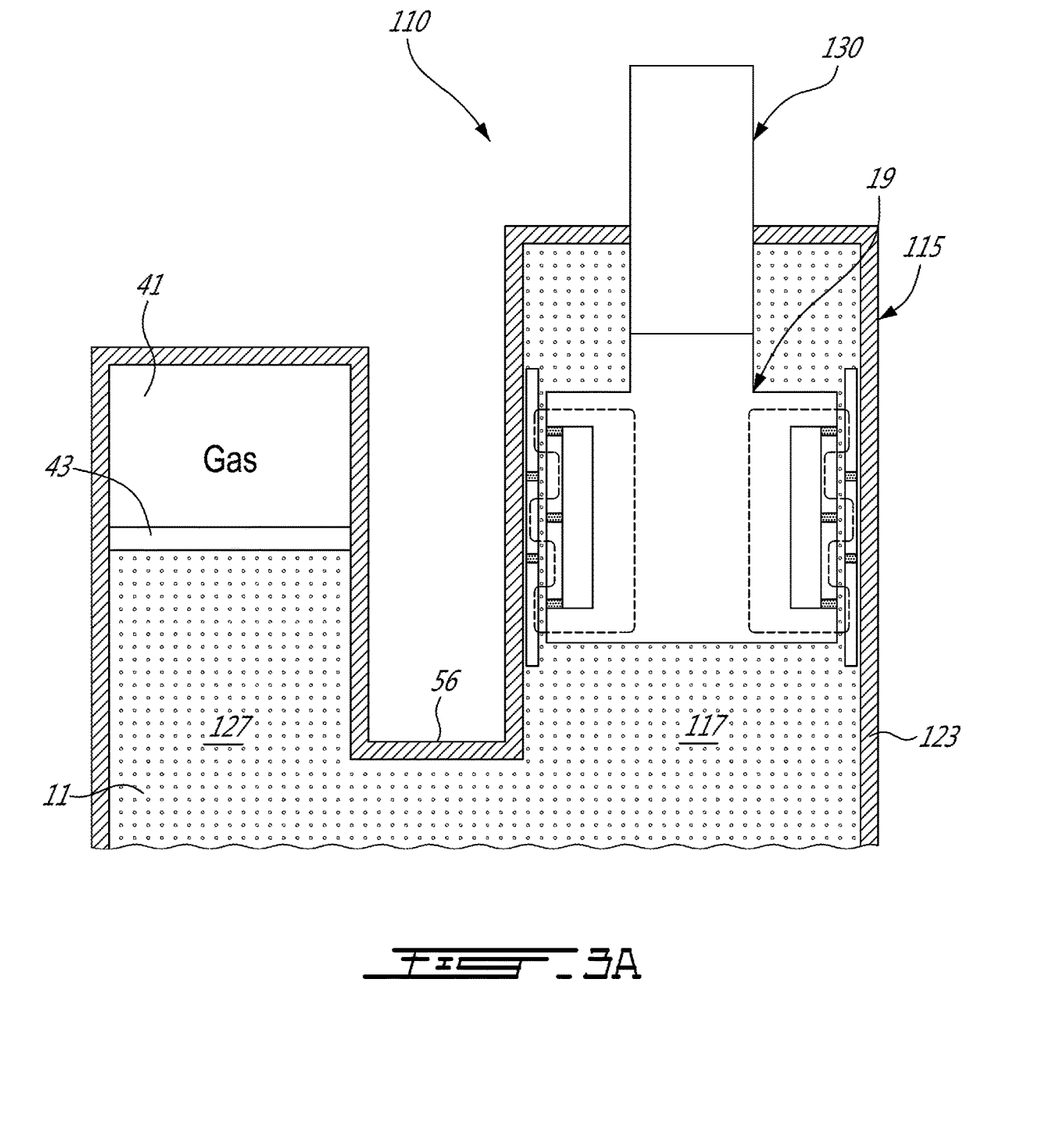
FIG. 3A is a cross-sectional side view of a smart fluid damper in accordance with another embodiment of the present disclosure, wherein a flow control element of the smart fluid damper is displaceable and forms part of a piston of the smart fluid damper.
Figure 3B:
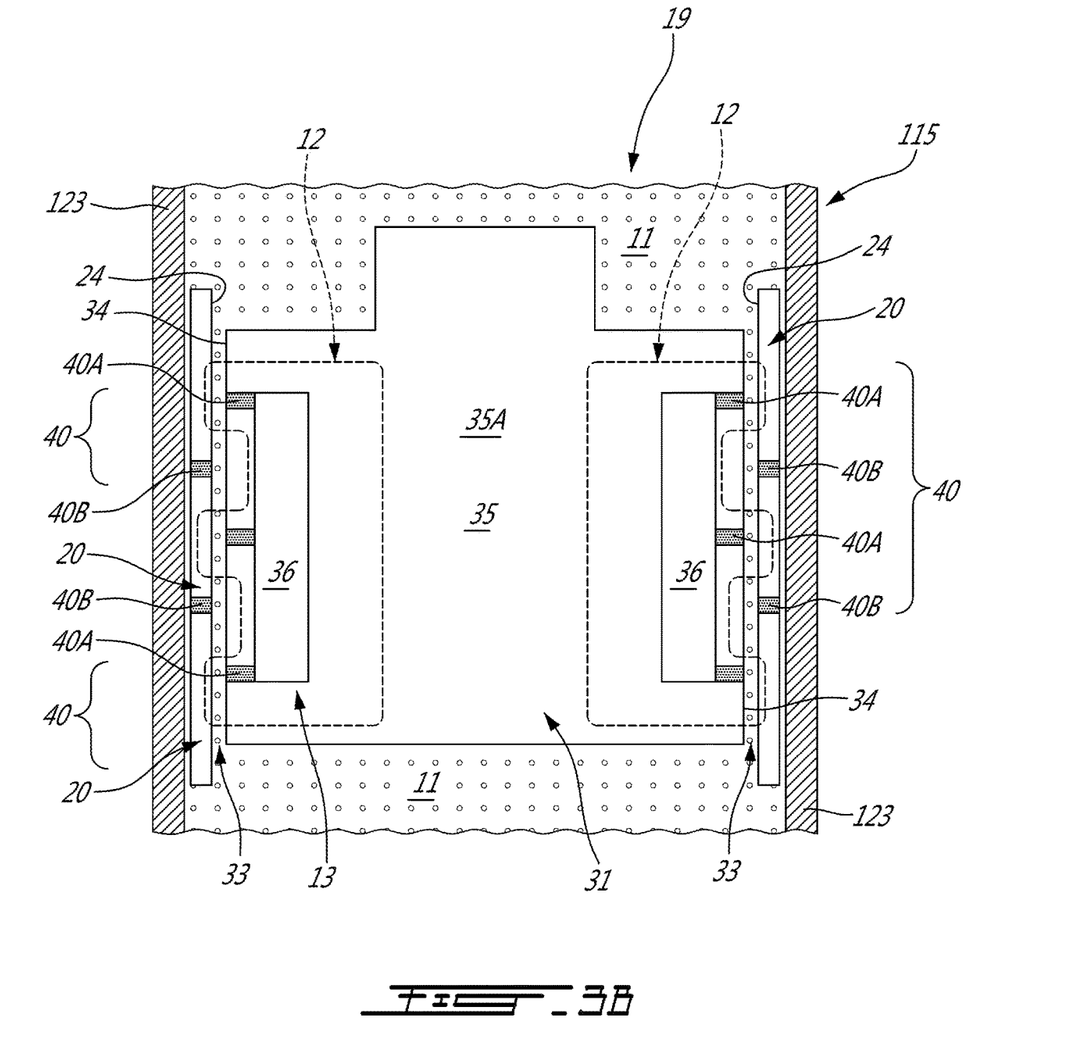
FIG. 3B is a detailed cross-sectional side view of the flow control element of the smart fluid damper of FIG. 3A.

With initial reference to FIGS. 1B and 3B, for example, the MR dampers 10 and 110 of FIGS. 1A and 3A include flow control elements 9 and 19, respectively. The flow control elements 9, 19 include generally a main body 31 having a central core 35 that includes an electromagnet 13 having an energizable coil 36 operable to generate a magnetic field 12 when activated, an outer housing 20 that surrounds the main body 31, and magnetic field barriers 40 which guide and/or control the magnetic field 12 generated by the coil 36 to keep the magnetic field 12 focused on the MR fluid 11, as will be described in further detail below.

Figure 5A:
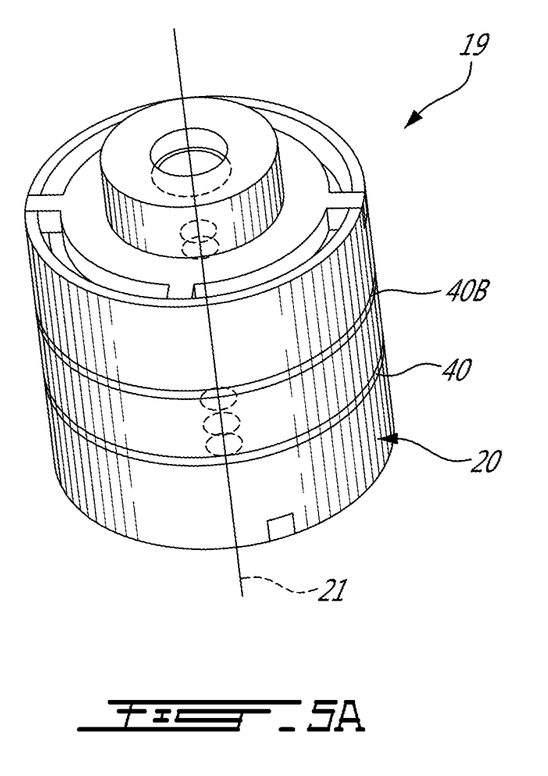
FIG. 5A is a perspective view of the piston head and flow control element of the smart fluid damper of FIG. 3A.
Figure 5B:
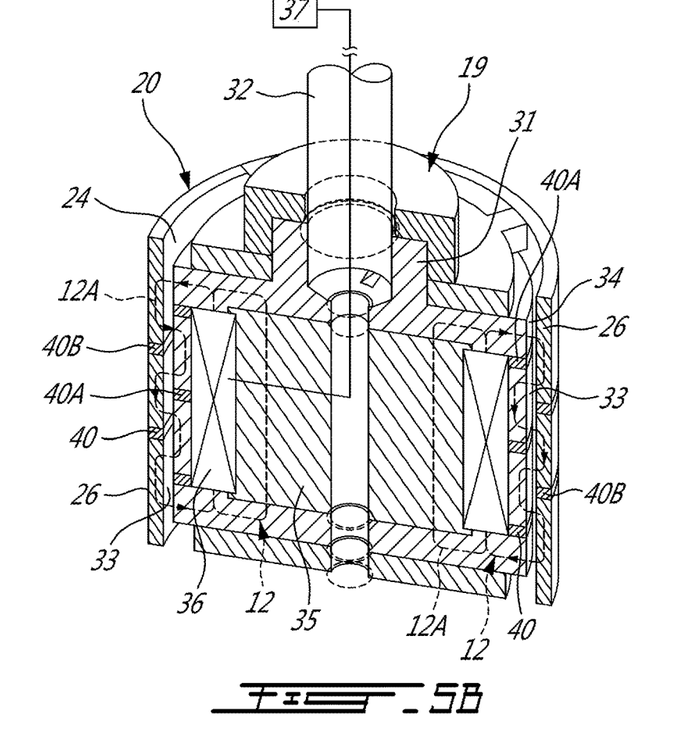
FIG. 5B is a perspective cross-sectional view of the piston head and flow control element of FIG. 5A.
Figure 5C:
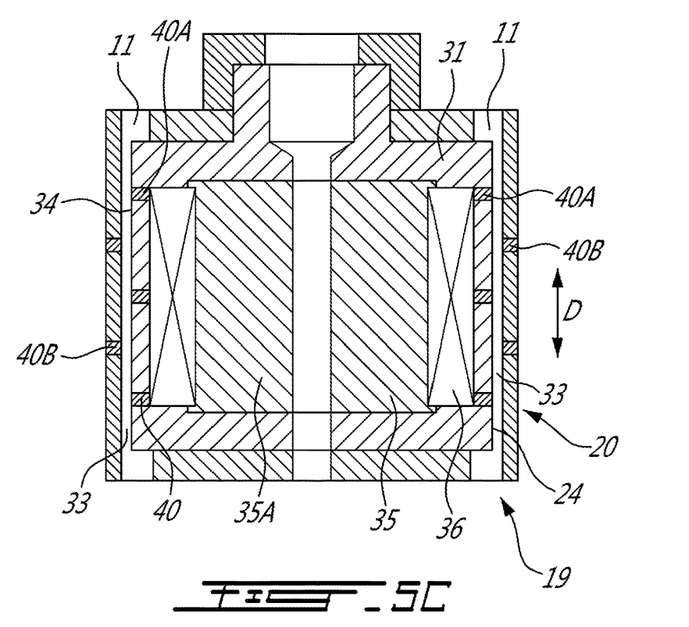
FIG. 5C is a side cross-sectional view of the piston head and flow control element of FIG. 5A.

As depicted in the embodiments of FIGS. 1B and 3B, the central core 35 may be formed of the same material as the main body 31, in which case the central core 35 and the main body 31 can be integrally formed. In an alternate embodiment however, such as depicted in FIGS. 5A-5C for example, the central core 35 is formed of a material that is different from the material of the remainder of the body 31 of the flow control element. Regardless, the central core 35 is that portion of the flow control element around which the coil 36 is wound.

The outer housing 20 is spaced apart form the main body 31 such as to define a fluid passage 33 therebetween, which is disposed within the magnetic field 12 generated by the coil 36. In the depicted embodiment, this fluid passage 33 is annular, extending about the full circumference of the main body 31, between the main body 31 and the outer housing 20 of the flow control element 9, 19, which is tubular and concentric with the main body 31. More specifically, the fluid passage 33 is annular and defined between a radially outer surface of the main body 31 and a radially inner surface of the outer housing 20, and extends axially through the complete length of the flow control element 9, 19 such as to permit fluid flow through this annular fluid passage 33. The radial gap between the outer surface 34 of the main body 31 and the inner surface 24 of the outer housing 20 is however selected to be relatively small in comparison with the overall radial dimension (e.g. diameter) of both the main body 31 and the outer housing 20.

As can bee seen in FIGS. 1B and 3B, the fluid passage 33 defined between the body 31 and the housing 20 of the flow control elements 9, 19 forms an annular passage through which the flow of the MR fluid 11 through the flow control element 9, 19 is confined. Much as the shape of the housing 20 and the body 31 can differ from the cylindrical configurations depicted (in which both the body 31 and the housing 20 have a circular cross-sectional shape), the shape of the fluid passage 33 may also be different (e.g. non-annular, not continuous about the full circumference of the body 31, etc.). As will be explained in greater detail below, the viscosity of the MR fluid 11 in the fluid passage 33 is adjustable, thereby allowing the stiffness of the damper 10 to be modified. The fluid passage 33 therefore forms a magnetically-energizable passageway for the MR fluid 11.

The coil 36 of the electromagnet 13 of the flow control elements 9,19 includes one or more wires coiled around the core 35 and connected to an electric power source 37 (see FIG. 5B, not shown in FIGS. 1B and 3B). The coil 36 is disposed toward an outer portion of the body 31 in proximity to the fluid passage 33. This helps to ensure that even a relatively weak magnetic field 12 will reach the MR fluid 11 within the fluid passage 33. The magnetic field 12 is generated by applying a current through the coil 36. When the magnetic field 12 is applied, the ferromagnetic particles of the MR fluid 11 in the fluid passage 33 form chains aligned along the flux lines 12A of the magnetic field 12. This chain formation of the ferromagnetic particles within the fluid increases the effective viscosity of the MR fluid 11 within the fluid passage 33. Consequently, because the fluid is more viscous, less of the MR fluid can flow through the fluid passage 33 and/or it will take longer for the same quantity of MR fluid to flow therethrough. A modifiable and variable restriction of the flow of the fluid through the flow control element 9, 19, and thus within the damper 10, 110, is thus created. Similarly, exposing the MR fluid 11 in the fluid passage 33 to a varying magnetic field 12 generated by providing a varying electric current to the coil 36, varies the viscosity of the MR fluid 11 in the fluid passage 33, and thus varies the speed and/or quantity of the MR fluid 11 that can pass through the fluid passage 33. The damping effect of the damper when acting as a shock absorber can therefore be modified and varied, as desired, in order to control (e.g. increase or decrease) the damping effect of the damper.

Still referring to the flow control elements 9 and 19 of FIGS. 1B and 3B, the magnetic field barriers 40 form obstacles to the flux lines 12A of the magnetic field 12 and help to channel and/or redirect the flux lines 12A to substantially confine them to the fluid passage 33 and thus to the MR fluid 11 therein. Each barrier 40 can take any suitable form, or be made from any suitable non-magnetic material, in order to achieve such functionality. In the depicted embodiments of FIGS. 1B and 3B, each magnetic field barrier 40 is an annular metallic, but non-magnetic, ring disposed either within the outer wall 34 of the body 31 or within the inner wall 24 of the housing 20. Aluminum may for example be selected as the non-magnetic metal forming the barriers 40. Aluminum is electrically conductive and also non-magnetic when exposed to low-level magnetic fields, while remaining lightweight. In alternate embodiments, however, each magnetic field barrier 40 may be a wire that extends about the periphery of the body 31 and/or within the housing 20. The barriers 40 may also be formed of other non-magnetic materials, such as polymer, ceramic, and the like. In all cases, however, the magnetic field barriers 40 act to block magnetic field flux lines, causing them to be "re-directed" or to pass through another section of either the body 31 or the outer housing 20 which provides a path of lower resistance to the magnetic field flux. The barriers 40 may also be used as sealing devices to seal the space between the outer surface of the outer housing 20 and the damper body 15.

Consequently, by arranging a number of the magnetic field barriers 40 in a predetermined pattern within both the body 31 and the outer housing 20 of the flow control elements 9,19, the magnetic field generated by the coil 36 can be specifically focused within a select portion of the flow control element 9, 19—namely within the fluid passage 33. The density of the magnetic field 12 to which the MR fluid 11 within the fluid passage 33 is exposed, due to the presence of the magnetic field barriers 40 and the pattern in which they are arranged, is thus greater than the magnetic field 12 would otherwise be if the magnetic field barriers 40 were not present.

Referring to the embodiments of FIGS. 1B and 3B, the magnetic field barriers 40 are arranged in alternating configuration on opposite sides of the fluid passage 33. In other words, a first barrier 40A is disposed on the body 31, the next, immediate longitudinally or axially adjacent barrier 40B is disposed on the outer housing 20, the next longitudinally adjacent barrier 40A is disposed on the body 31, etc.

Each of the barriers 40 therefore has an axial position that is unique, and thus different from the axial positions of the other barriers 40. This forms a configuration in which the barriers 40 alternate axially, over the longitudinal length of the fluid passage 33, between opposite radial or lateral sides of the fluid passage 33. The flux lines 12A of the magnetic field 12 are thus forced, as a result of the barriers 40, to "zig-zag" back and forth in a stepped or square wave type pattern across the fluid passage 33, and thus cross the fluid passage 33 at multiple axial intervals. The MR fluid within the fluid passage 33 is thus exposed to greater magnetic flux density than it would if the barriers 40 were absent (with other parameters remaining the same—e.g. coil strength, electrical input levels to the electromagnet, etc.).

The longitudinal thickness of each barrier 40, as measured along a direction parallel to the longitudinal center axis 21, as well as the lateral thickness of each barrier, as measured along a direction transverse to the longitudinal axis 21, may vary. In the depicted embodiment, the longitudinal thickness of each barrier is about 1.2 times the width of the fluid passage 33, where the width of the fluid passage 33 is measured along a direction transverse to the longitudinal axis 21.

Referring still to FIGS. 1B and 3B, each magnetic field barrier 40 is therefore spaced apart from an adjacent magnetic field barrier 40 both in the direction of the longitudinal axis 21, and across the fluid passage 33. Indeed, the fluid passage 33 divides the barriers 40 into barriers 40A belonging to a first group, and barriers 40B belonging to a second group. The barriers 40A of the first group are mounted to the outer wall 34 of the body 31 and spaced-apart on the outer wall 34 in a direction parallel to the longitudinal axis 21. In the depicted embodiment, the barriers 40A are embedded in the outer wall 34. In alternate embodiments, the barriers 40A of the first group are applied to the surface of the outer wall 34. Other mounting configurations of the barriers 40A are also within the scope of the present disclosure. The barriers 40B of the second group are mounted to the outer housing 20 across the fluid passage 33 from the barriers 40A of the first group, and are also spaced-apart in a direction parallel to the longitudinal axis 21. While not longitudinally aligned, the barriers 40A of the first group and the barriers 40B of the second group each face, or are at least proximate to, the fluid passage 33 and disposed on opposite sides thereof. In the embodiment of FIGS. 1B and 10, the barriers 40B of the second group are mounted to the inner wall 24 of the housing 20 and spaced-apart on the inner wall 24 along the longitudinal axis 21. In one particular embodiment, the barriers 40B extend through the inner wall 24 and separate the housing 20 into wall segments 26. Other mounting configurations of the barriers 40B are also within the scope of the present disclosure. For example, in an embodiment, the barriers 40B are mounted on each other and held with a screw in the middle of the core 35. The screw may be made of a non-magnetic material such as aluminum, brass or non-magnetic stainless steel. This can alternatively be done with glue or press fitting.

This configuration of the barriers 40A,40B alters the path of the flux lines 12A of the magnetic field 12 through the fluid passage 33. More particularly, the flux lines 12A adjacent to the fluid passage 33 are obstructed by the barriers 40A,40B on either side of the fluid passage 33. This causes the flux lines 12A adjacent to the fluid passage 33 to repeatedly cross the fluid passage 33 between the barriers 40A,40B in an alternating fashion, forming a serpentine or winding path (having a square-wave type configuration, for example) as schematically represented in FIGS. 1B and 3B.

The length of the flux lines 12A along the winding path is longer than a comparable straight flux line 12A through the fluid passage 33. The barriers 40A,40B therefore increase the length of the effective magnetic pole formed by the outer wall 34 and the inner wall 24. By increasing the length of the magnetic pole, it is understood that the force from the effect of the MR fluid is also increased. This allows the damper 10 to generate greater damping force without increasing the overall size, length, and diameter of the body 31 or the housing 20. This minimises the size, and thus the weight, of the damper 10. Furthermore, this configuration of the barriers 40A,40B allows a greater length of the body 31 to be used as the magnetic pole without having to add extra parts to the body 31 that would increase its weight. Therefore, this configuration of the barriers 40A,40B allows substantially the whole length of the body 31, except the barriers 40, to be used as the magnetic pole. The number of barriers 40 is not limited to the number in the depicted embodiments. More or fewer barriers 40 can be used depending on the desired length of the magnetic pole and the space envelope available for the given damper design, amongst other factors. Additionally, the size of each barrier 40, the spacing between barriers 40 on one or both of the opposed sides of the fluid passage, and the layout or pattern of the barriers 40, may also vary.

The relative position of the barriers 40A of the first group with respect to the barriers 40B of the second group does not change. More particularly, an axial distance is defined between the axial position of each barrier 40A of the first group and the axial position of each barrier 40B of the second group. These axial distances remain constant, and do not change during operation of the damper 10,110. Viewed in another manner, the outer housing 20 maintains the same relative position with respect to the main body 31 during operation of the damper 10,110.

As will be described further below, the flow control element 9 and the flow control element 19 differ in that the flow control element 9 is stationary within the damper 10 and the flow control element 19 is displaceable within the damper 110.

More specifically, in the damper 10 of FIGS. 1A-1B, the outer housing 20 of the flow control element 9 is permanently fastened in place on a portion of the outer wall 23 of the damper body 15, such that the flow control element 9 remains stationary within the damper body 15. In this configuration, the flow control element 9 acts as a valve, whereby MR fluid 11 flows through the above-mentioned fluid passage(s) 33 of the flow control element 9, and flow within the damper 10 is controlled, or regulated, by the flow control element 9.

In the embodiment of FIG. 3B, the flow control element 19 is displaceable within, and relative to, the outer wall 123 of the damper body 115. More specifically, in the damper 110 of FIGS. 3A-3B, the flow control element 19 forms part of the head of a piston 130, which is slidingly displaceable within the outer wall 123 of the body 115 of the damper 110. Accordingly, in this embodiment, the entire flow control element 19 slides back and forth within the body 115 of the damper 110, as the piston 130 extends and contracts. Each of these embodiments will be described in further detail below.

Having generally described the flow control elements 9, 19, the dampers 10 and 110 respectively having these flow control elements 9, 19 will now be described, with reference to FIGS. 1A-1B and FIGS. 3A-3B, respectively.

Referring to FIGS. 1A-1B, the damper 10 includes generally the damper body 15 having outer wall 23 that encloses a cavity containing the MR fluid 11. In this embodiment, the damper body 15 defines a first cavity portion 17 and a second cavity portion 27 which are disposed in fluid flow communication with each other. A damper piston 30 translates within the first cavity portion 17 of the damper 10 and the flow control element 9 is disposed within the second cavity portion 27 of the damper 10 that is located next to and is generally parallel to the first cavity portion 17. The first and second cavity portions 17, 27 are separate from each other, and are fluidly connected via a fluid bridge 56 such as to permit fluid flow therebetween. In addition to the MR fluid 11 contained within the cavity portions 17, 27 of the damper 10, a gas 41 is also provided within the second cavity portion 27 and is separated from the MR liquid by a floating sealing element 43.

As noted above, the flow control element 9 of the damper 10 is disposed in a fixed position within the outer wall 23 of the body 15, and more specifically within the second cavity portion 27 therewithin. The flow control element 9 therefore acts as a stationary valve, and operates to control, or meter, the amount of MR fluid 11 that flows therethrough, from one side of the flow control element 9 to the other within the second cavity portion 27 of the damper 10. The piston 30 of the damper 10 therefore includes only a shim stack at the head 51 of the piston 30. This configuration of the damper 10 enables the force of the damper in its "off-state" (i.e. wherein the magnetic system is turned off) in both compression and rebound to be independently adjusted by adjusting the number, size and thickness of shims in the shim stack at the head 51. This configuration also permits the force of the damper 10 in the rebound direction to be significantly higher than the force on the compression side of the stroke, which may be particularly well suited for use in a bicycle suspension application, for example. In one particular embodiment of the present disclosure, therefore, the damper 10 is used as a shock absorber within a suspension system 301 of a bicycle 300 (see FIG. 8).

Figure 2:
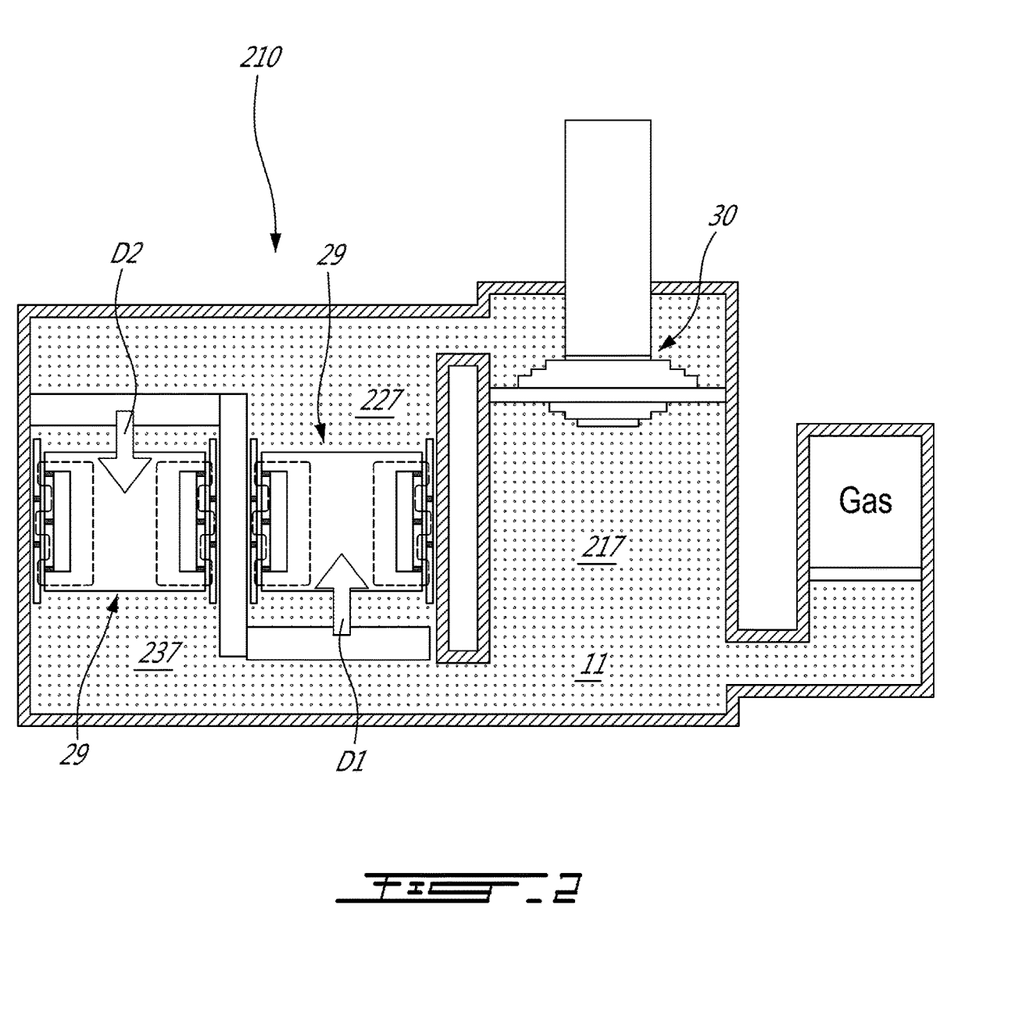
FIG. 2 is a cross-sectional side view of an alternate embodiment of the smart fluid damper of FIG. 1A, having two stationary flow control elements in parallel, each operating as a unidirectional valve.

Other embodiments of dampers having stationary flow control elements are within the scope of the present disclosure. For example, FIG. 2 shows an alternate embodiment of the smart fluid damper 10 of FIGS. 1A and 1B, where the damper 210 has two stationary flow control elements 29. The damper 210 has three cavities: a first cavity portion 217 housing the piston 30, a second cavity portion 227 housing one of the stationary flow control elements 29, and a third cavity portion 237 housing the other stationary flow control element 29. The cavity portions 217, 227, 237 are fluidly connected such as to permit fluid flow therebetween. The flow control elements 29 are disposed parallel to one another in the second and third cavity portions 227, 237. Each flow control element 29 in the depicted embodiment is energized such that the magnetic field generated by each flow control element 29 allows it to act as a one-way, or unidirectional, valve. For example, in the depicted embodiment, the flow control element 29 in the second cavity portion 227 is energised to allow flow of the MR fluid 11 through its fluid passage 33 only in the direction D1 as the piston 30 extends within the first cavity portion 217. Similarly, the flow control element 29 in the third cavity portion 237 is energised to allow flow of the MR fluid 11 through its fluid passage 33 only in the direction D2, which is opposite to the direction D1, as the piston 30 extends within the first cavity portion 217.

As noted above, in the damper 110 of FIGS. 3A-3B, the flow control element 19 forms part of the head of a piston 130, and is slidingly displaceable within the outer wall 123 of the body 115 of the damper 110. In this embodiment, the damper body 115 defines a first cavity portion 117 and a second cavity portion 127 which are disposed in fluid flow communication with each other. The damper piston 130 with the flow control element 19 piston head translates within the first cavity portion 117 of the damper 110. The first and second cavity portions 117, 127 are separate from one another, and are fluidly connected via a fluid bridge 56 such as to permit fluid flow therebetween. In addition to the MR fluid 11 contained within the cavity portions 117, 127 of the damper 110, a gas 41 is also provided within the second cavity portion 127 and is separated from the MR liquid by a floating sealing element 143.

As noted above, the flow control element 19 of the damper 110 translates within the outer wall 23 of the body 115, and more specifically within the first cavity portion 117. The displacement of the flow control element 19 within the first cavity portion 117, and thus the displacement of the piston 130, can be controlled by modulating the magnetic field created by the flow control element 19 to vary the viscosity of the MR fluid within the flow passage 33. The flow control element 19 therefore acts as an adjustable piston whose stiffness can be varied rapidly as desired by modulating the viscosity of MR fluid 11 that flows therethrough, from one side of the flow control element 19 to the other within the first cavity portion 117.

Figure 4:
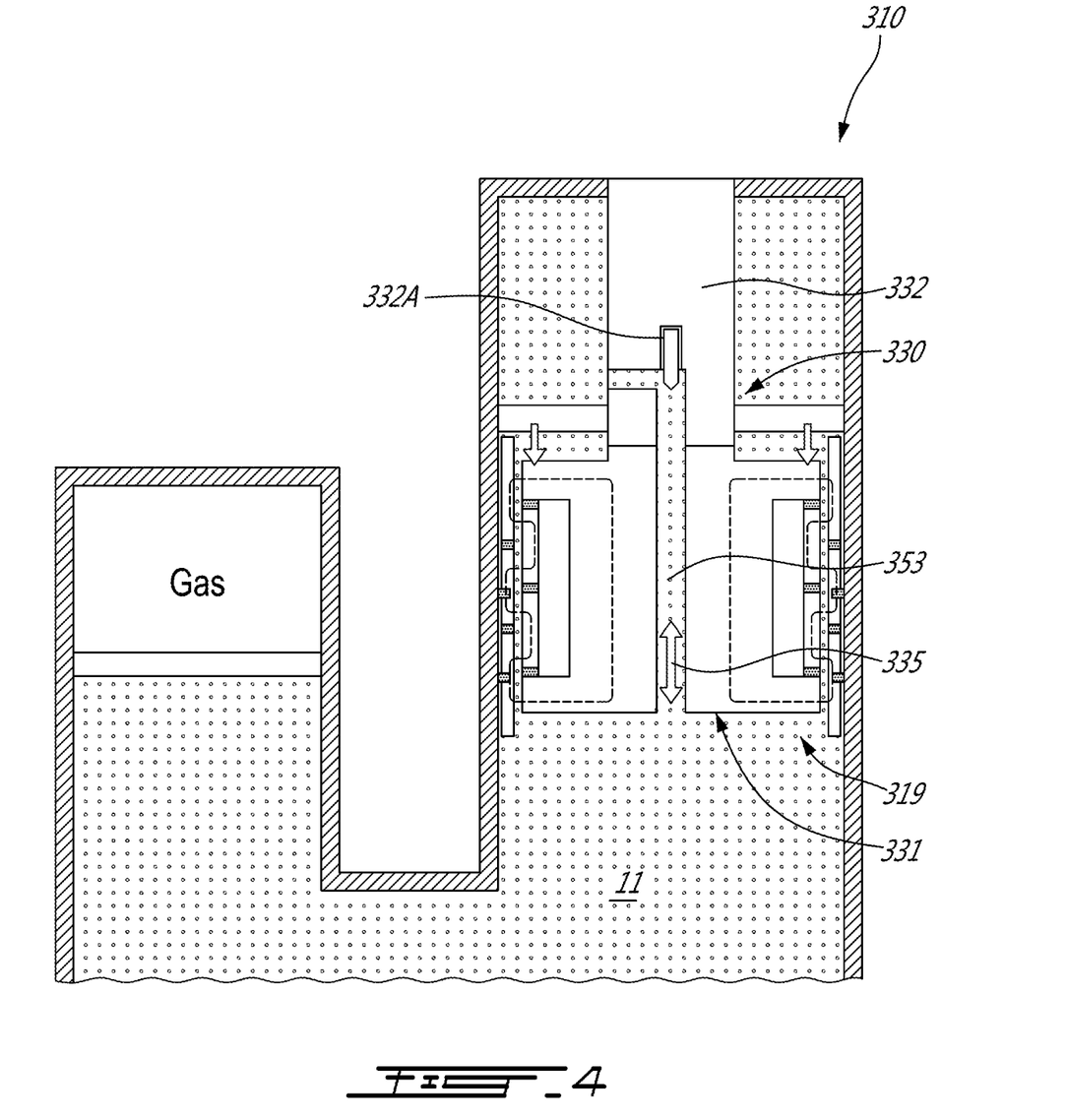
FIG. 4 is a cross-sectional side view of an alternate embodiment of the smart fluid damper of FIG. 3A, having an independent piston with an additional adjustable flow passage.

Other embodiments of dampers having displaceable flow control elements are within the scope of the present disclosure. For example, FIG. 4 shows an alternate embodiment of the smart fluid damper 110 of FIGS. 3A and 3B, where the damper 310 has an additional flow passage 353 extending through the central core 335 of the body 331 of the flow control element 319. A portion of the additional flow passage 353 also extends through the piston rod 332 of the piston 330. The piston rod 332 includes a flow control device 332A, shown in FIG. 4 as a needle, to control the flow of MR fluid 11 through the additional flow passage 353. The flow control device 332A helps to further modulate the displacement of the piston 330, and the direction of displacement, by adjusting the flow of MR fluid 11 through the core 335 of the flow control element 319 when the flow control element 319 is displaced.

Referring to FIGS. 5A to 5C, which show the flow control element 19 piston head of FIGS. 3A and 3B in greater detail, the flow control element 19 slides in a direction D parallel to the longitudinal axis 21. The piston rod 32 attached to the flow control element 19 is displaced by the source of shock or vibration. The flow control element 19 is therefore directly or indirectly linked to the source of shock or vibration. In the depicted embodiment, the piston rod 32 has one end mounted to the main body 31 of the flow control element 19, and an opposite end outside the damper body 115 that is mounted to a component that responds to the source of shock or vibration. In alternate embodiments, the flow control element 19 is mounted to a bracket, or is otherwise mechanically linked to the source of shock or vibration.

In the embodiment of FIGS. 1B and 3B, the core 35 includes a permanent magnet 35A. The permanent magnet 35A is made from a material that is magnetized to create its own persistent magnetic field 12. The material is magnetized, for example, by sending a current through the coil 36, and can remain magnetized after the external field is removed. The material of the permanent magnet 35A is ferromagnetic. In the depicted embodiment, the ferromagnetic material of the core 35A is AlNiCo. AlNiCo is an acronym referring to a family of iron alloys which in addition to iron are composed primarily of aluminium (Al), nickel (Ni) and cobalt (Co). The AlNiCo core 35A has controllable magnetic behaviour. More particularly, it has a relatively high coercivity and therefore has a relatively high resistance to loss of magnetism. Therefore, once the AlNiCo core 35A is magnetized by sending a current through the coil 36, it may not require any more electric current to maintain the magnetic field 12. The damper 10 is therefore able to consume significantly less power when compared to a core that requires a constant current in order to remain magnetized. The AlNiCo core 35A can be demagnetized by sending a pulse of current through the coil 36 in the opposite direction. The ability of AlNiCo core 35A to be magnetized for significant periods of time, and to be demagnetized quickly, helps to provide the damper 10 with variable and adjustable damping.

Figure 6A:
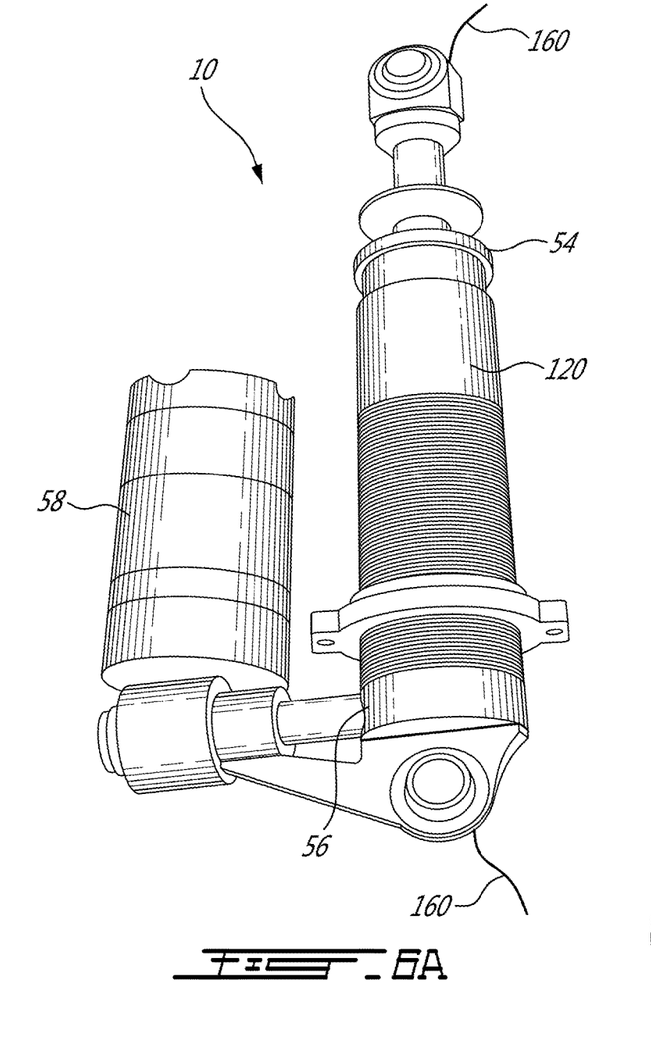
FIG. 6A is a perspective view of the smart fluid damper of FIG. 3A.
Figure 6B:
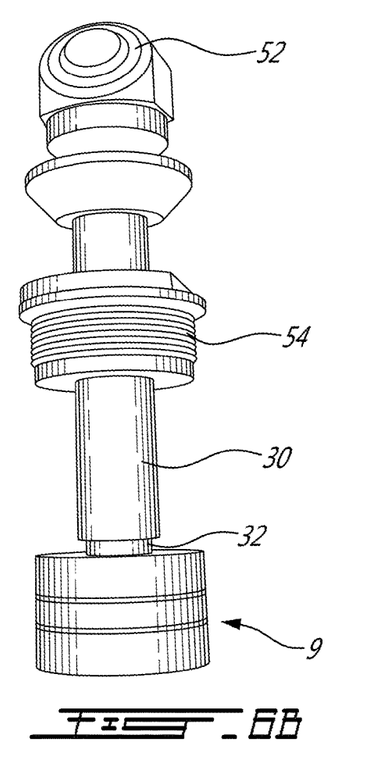
FIG. 6B is a detailed perspective view of the piston of the smart fluid damper of FIG. 6A.

FIGS. 6A and 6B show additional components of the damper 10 of FIG. 3A. The piston rod 32 extends from the flow control element 9. The piston rod 32 is housed within a protective sleeve 50 which has a sealing member 54. The piston rod 32, protective sleeve 50, and the flow control element 9 are placed within the first cavity portion 17 defined by an outer casing 120. A distal end of the piston rod 32 is coupled to a mounting bracket 52 which mounts to the structure that transmits shock or vibration to the damper 10. A fluid bridge 56 extends between the outer casing 120 and a second casing 58 defining the second cavity portion 27. The fluid bridge 56 allows the MR fluid 11 to be fluidly communicated between the first and second cavity portions 17, 27. A wire 160 is provided through the interior of the piston rod 32 to energize the coil 36 of the flow control element 9.

Figure 7A:
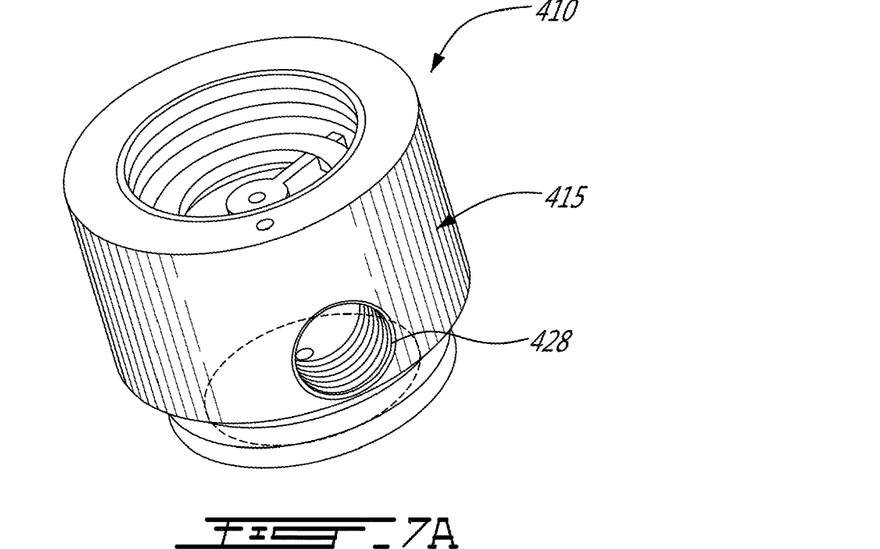
FIG. 7A is a perspective view of a part of the smart fluid damper of FIG. 1A.
Figure 7B:
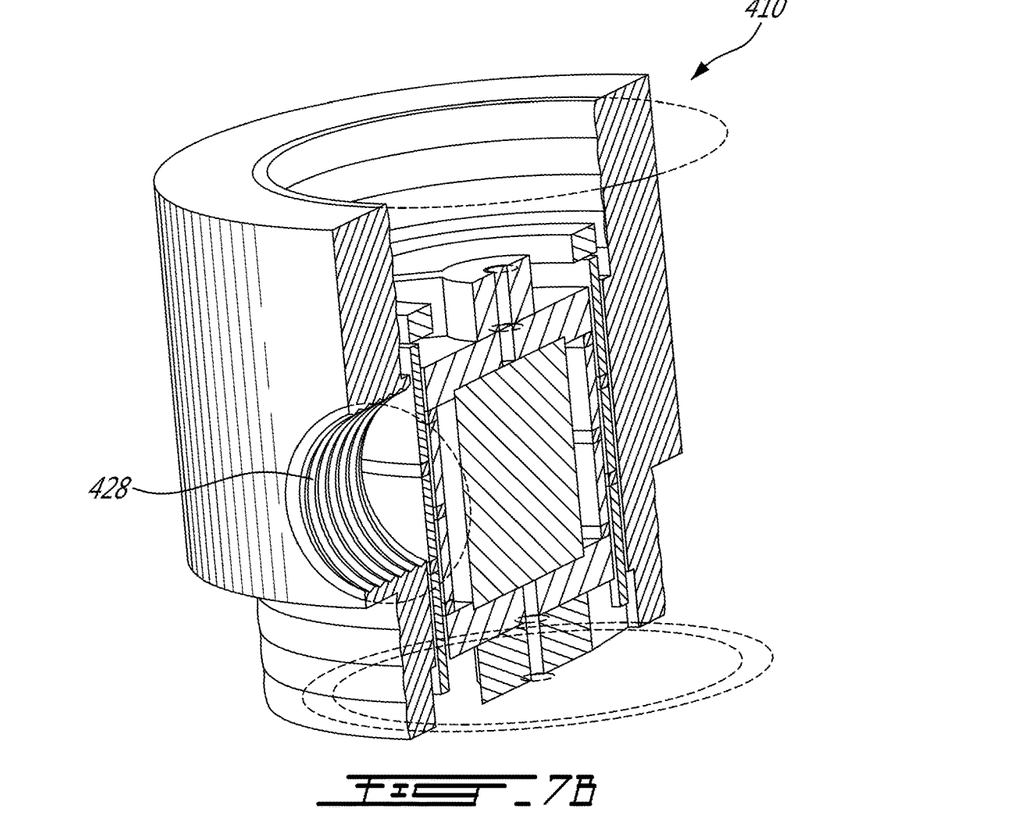
FIG. 7B is a perspective cross-sectional view of the part of the smart fluid damper of FIG. 7A.

FIGS. 7A and 7B show part of another embodiment of a damper 410. The damper 410 is substantially similar to the dampers 10, 110, 210, 310 described above, and therefore components of the damper 410 that are similar to components of the dampers 10, 110, 210, 310 will bear similar reference numbers. The damper 410 is used as part of a valve. More particularly, the damper housing 415 has a port 428 for feeding wires to and from the interior cavities of the damper housing 415, which houses a flow control element.

Figure 8:
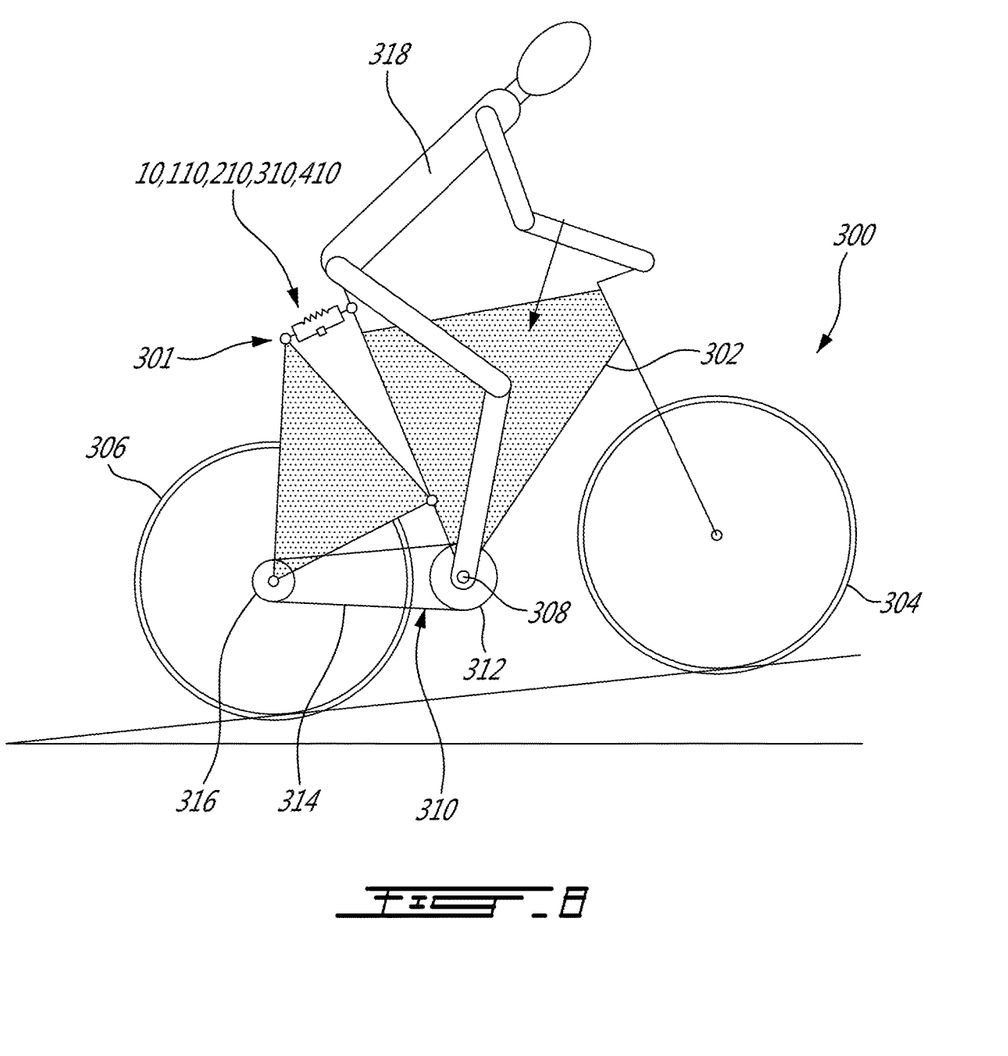
FIG. 8 is a schematic side elevational view of a bicycle having a smart fluid damper as described herein.

FIG. 8 shows a bicycle 300 having any one of the dampers 10, 110, 210, 310, 410 disclosed herein. The bicycle 300 has a frame 302 to which a front wheel 304 and a rear wheel 306 are rotatable mounted. A bottom bracket shell 308 is fixed to a bottom end of the frame 302. The bicycle 300 has a drive train 310. The drive train 310 has a crank shaft (not shown in FIG. 8) mounted within the bottom bracket shell 308. A pedal crank 312 is mounted to the crank shaft, and the crank shaft and the pedal crank 312 are rotated about a common crank shaft axis by a pedaling actuation. A drive chain 314 extends between and engages the pedal crank 312 and a rear sprocket 316 of the rear wheel 306 to transmit the pedaling actuation to the rear wheel 306. The damper 10, 110, 210, 310, 410 may be mounted to any suitable portion of the frame 302 of the bicycle 300, in order to dampen any shocks or vibrations that would otherwise be transmitted through to the rider 318 of the bicycle 300. More particularly, the bicycle 300 may include a suspension system 301 having the damper 10, 110, 210, 310, 410 disposed between a portion of the frame 302 and at least one of the rear wheel 306 and the front wheel 304 of the bicycle, as is well known. One or both of the rear wheel suspension and the front wheel (front fork) suspension may include a damper 10, 110, 210, 310, 410.

Referring to FIGS. 1B and 3B, there is also disclosed a method of dampening a movement with a smart fluid damper 10, 110. The method includes energizing the flow control element 9, 19 to apply a field 12A to the fluid 11 in the fluid passage 33. The field 12A crosses the fluid passage 33 at multiple axial intervals.

It can thus be appreciated that the damper 10, 110, 210, 310, 410 disclosed herein helps to, in at least some embodiments, produce more damping force compared to a conventional MR damper having the same size and weight (or alternately, provide the same amount of damping force but in a smaller and/or lighter weight package), and also helps to minimize the power consumption by using a core 35 that remains magnetized for a relatively long period of time.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A smart fluid damper, comprising:
a damper body defining a cavity having a smart fluid stored therein;
a piston having a piston head disposed within the cavity of the damper body and slidingly displaceable therein along a piston axis; and
a flow control element disposed within the cavity of the damper body, the flow control element including a main body having a central core, an outer housing that surrounds the main body and is spaced apart therefrom to define at least one fluid passage between the main body and the outer housing, the fluid passage extending a complete axial length of the main body to permit fluid flow therethrough from one axial side of the flow control element to the other, the central core including an energizable coil operable to generate a field to the smart fluid in the fluid passage, and a plurality of field barriers each operable to locally block the field generated by the energizable coil such that the field cannot pass therethrough, a first group of the field barriers being mounted to the main body of the flow control element and axially spaced-apart along the main body, a second group of the field barriers being mounted to the outer housing of the flow control element across the fluid passage and axially spaced-apart along the outer housing, the first and second groups of the field barriers configured to focus the field within the fluid passage.

2. The damper as defined in claim 1, wherein the first and second groups of field barriers are disposed in an axially alternating configuration across the fluid passage.

3. The damper as defined in claim 1, wherein the axially-spaced apart field barriers of the first group of the field barriers each have a unique axial position along the main body, and the axially-spaced apart field barriers of the second group of the field barriers has a unique axial position on the outer housing, the axial positions of the field barriers of the first group being different from the axial positions of the field barriers of the second group.

4. The damper as defined in claim 3, wherein a first one of the field barriers is disposed on one of the main body and the outer housing, another one of the field barriers being immediately axially adjacent to the first one of the field barriers being disposed on the other of the main body and the outer housing.

5. The damper as defined in claim 3, wherein an axial distance is defined between the axial position of each field barrier of the first group and the axial position of each field barrier of the second group, the axial distances remaining constant.

6. The damper as defined in claim 1, wherein the flow control element is stationary within the cavity of the damper body.

7. The damper as defined in claim 6, wherein the cavity includes a first cavity portion and at least a second cavity portion separate from the first cavity portion, a fluid bridge extending between the first and second cavity portions and providing fluid communication therebetween, the piston head being slidingly displaceable within the first cavity portion and the flow control element being fixedly positioned in the second cavity portion.

8. The damper as defined in claim 1, wherein the flow control element is displaceable within the cavity of the damper body.

9. The damper as defined in claim 8, wherein the flow control element is mounted to the piston head and is slidingly displaceable therewith along the piston axis.

10. The damper as defined in claim 1, wherein the core of the piston body includes a permanent magnet.

11. The damper as defined in claim 1, wherein at least the core of the piston body is made from a ferromagnetic material.

12. The damper as defined in claim 11, wherein the ferromagnetic material is AlNiCo.

13. The damper as defined in claim 1, wherein the smart fluid is a magnetorheological (MR) fluid, the energizable coil being operable to apply a magnetic field to the MR fluid in the fluid passage.

14. The damper as defined in claim 13, wherein the energizable coil is operable to apply the magnetic field to the MR fluid to permit the MR fluid to flow through the fluid passage in only one direction.

15. The damper as defined in claim 1, wherein the smart fluid is one of a magnetorheological (MR) fluid and an electrorheological (ER) fluid.

16. The damper as defined in claim 1, wherein each field barrier has an axial thickness, a width of the fluid passage being measured along a direction transverse to the complete axial length of the main body, the thickness of each barrier being greater than the width of the fluid passage.

17. A method of dampening a movement with a smart fluid damper, the method comprising using a flow control element disposed within a cavity of the damper to apply a field to the smart fluid within a fluid passage extending through the flow control element, and using a number of field barriers disposed within the flow control element and proximate the fluid passage on either side thereof to locally block the field such that the field cannot pass therethrough, the field barriers arranged to cause the field to criss-cross the fluid passage at multiple axial intervals thereby focusing the field within the fluid passage.

18. A magnetorheological (MR) fluid damper comprising a damper body defining therewithin a cavity containing an MR fluid therewithin and a piston having a piston head displaceable within the cavity, and a flow control element disposed within the cavity of the damper body and configured to apply a magnetic field to the MR fluid within a fluid passage axially extending through the flow control element to allow the MR fluid to flow from one side of the flow control element to the other within the cavity, the flow control element having a number of field barriers disposed on either side of the fluid passage, the field barriers operable to locally block and/or divert the magnetic field such that the field cannot pass directly therethrough, the field barriers staggered on either side of the fluid passage to force the magnetic field to criss-cross the fluid passage at multiple axial intervals along the fluid passage thereby focusing the magnetic field within the fluid passage.

* * * * *